US008561206B1

(12) United States Patent
Paul et al.

(10) Patent No.: US 8,561,206 B1
(45) Date of Patent: Oct. 15, 2013

(54) SYSTEM, METHOD, AND COMPUTER PROGRAM PRODUCT FOR ALLOWING ACCESS TO DATA BASED ON A RECIPIENT IDENTIFIER INCLUDED WITH THE DATA

(75) Inventors: Manabendra Paul, Karimganj (IN); Abhilash Chandran, Kollam (IN)

(73) Assignee: McAfee, Inc., Santa Clara, CA (US)

( * ) Notice: Subject to any disclaimer, the term of this patent is extended or adjusted under 35 U.S.C. 154(b) by 991 days.

(21) Appl. No.: 12/166,187

(22) Filed: Jul. 1, 2008

(51) Int. Cl.
*G06F 7/04* (2006.01)
(52) U.S. Cl.
USPC ............. 726/27; 713/168; 713/169; 713/170; 713/171; 713/172; 726/28; 726/29; 726/30
(58) Field of Classification Search
USPC .......................................................... 713/27
See application file for complete search history.

(56) References Cited

U.S. PATENT DOCUMENTS

| | | | | |
|---|---|---|---|---|
| 6,014,711 A | * | 1/2000 | Brown | 709/245 |
| 6,253,193 B1 | * | 6/2001 | Ginter et al. | 705/57 |
| 2002/0194470 A1 | * | 12/2002 | Grupe | 713/153 |
| 2005/0138388 A1 | * | 6/2005 | Paganetti et al. | 713/185 |
| 2010/0281535 A1 | * | 11/2010 | Perry et al. | 726/22 |

* cited by examiner

*Primary Examiner* — Longbit Chai
(74) *Attorney, Agent, or Firm* — Wong, Cabello, Lutsch, Rutherford & Brucculeri, LLP (57) ABSTRACT

A system, method, and computer program product are provided for allowing access to data based on a recipient identifier included with the data. In use, data is received at a device of a recipient. Additionally, it is determined whether an identifier of the recipient is included with the data. Further, access to the data by the device of the recipient is conditionally allowed based on the determination.

15 Claims, 5 Drawing Sheets

SYSTEM, METHOD, AND COMPUTER PROGRAM PRODUCT FOR ALLOWING ACCESS TO DATA BASED ON A RECIPIENT IDENTIFIER INCLUDED WITH THE DATA

FIELD OF THE INVENTION

The present invention relates to accessing data, and more particularly to controlling access to data.

BACKGROUND

Traditionally, access to data has been controlled for various purposes. Oftentimes, access controls have been placed on data for preventing unwanted access to data which may result in data leakage. However, conventional techniques for controlling access to data have generally exhibited various limitations. Just by way of example, such conventional techniques have been based on creation of data fingerprints which are used for detecting data leakage. Reliance on data fingerprints in this manner has allowed access to data by a user that is unauthorized to have such access when via user of an authorized user's computer system.

There is thus a need for addressing these and/or other issues associated with the prior art.

SUMMARY

A system, method, and computer program product are provided for allowing access to data based on a recipient identifier included with the data. In use, data is received at a device of a recipient. Additionally, it is determined whether an identifier of the recipient is included with the data. Further, access to the data by the device of the recipient is conditionally allowed based on the determination.

DETAILED DESCRIPTION

Figure 1:
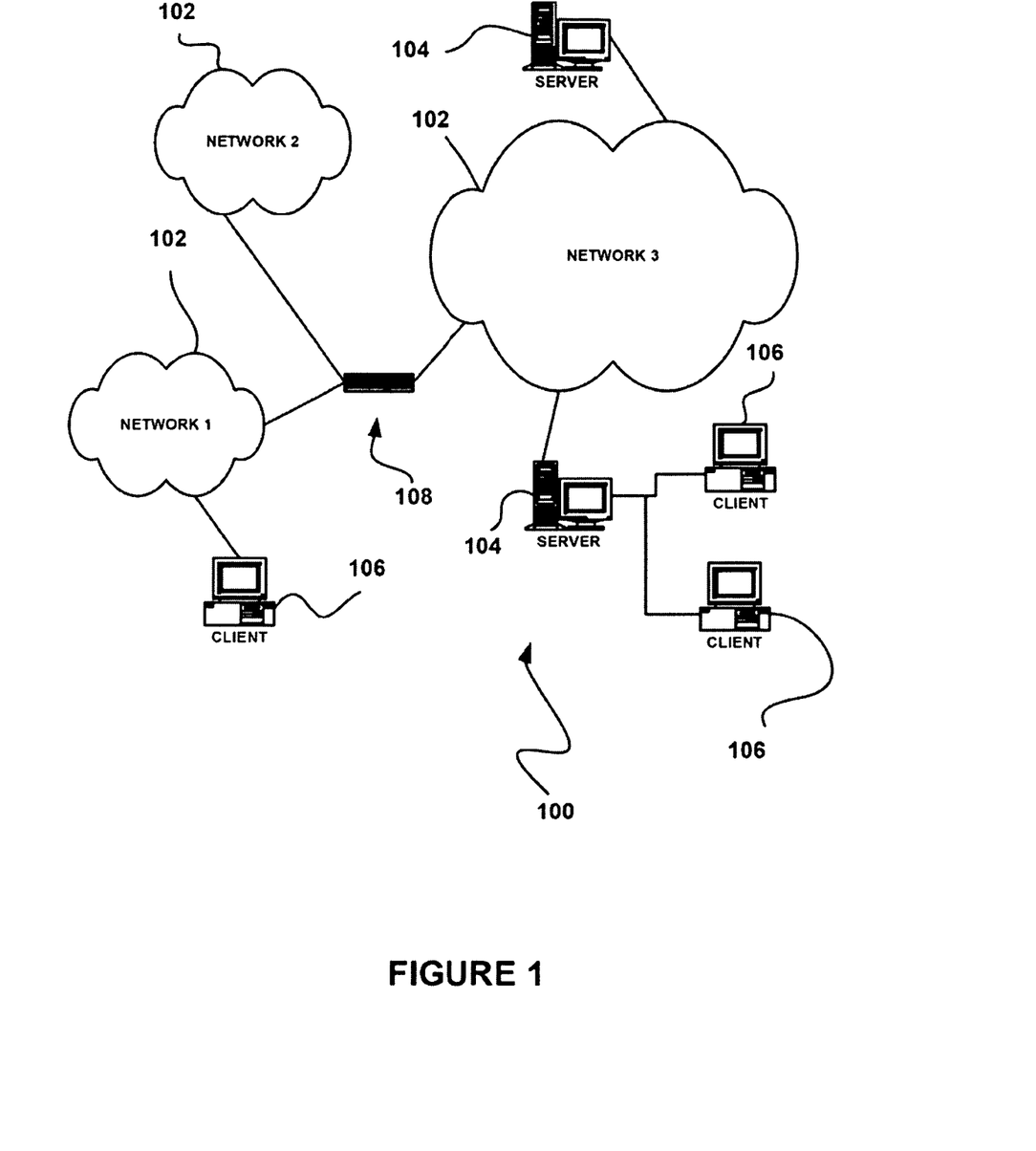
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
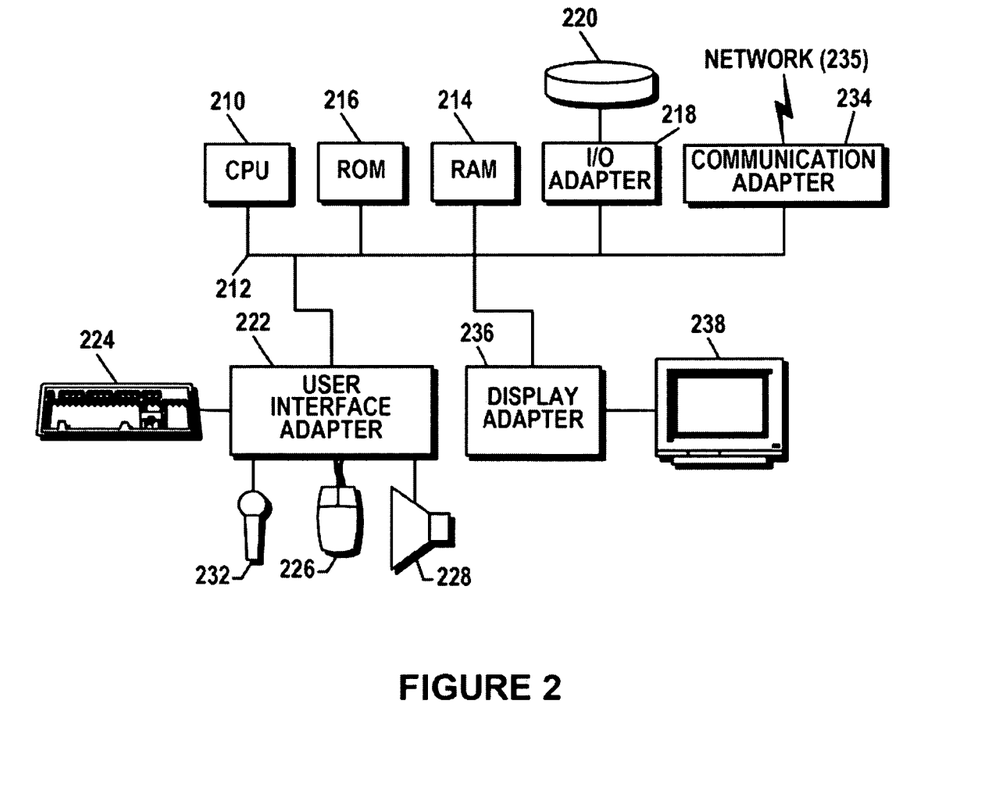
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
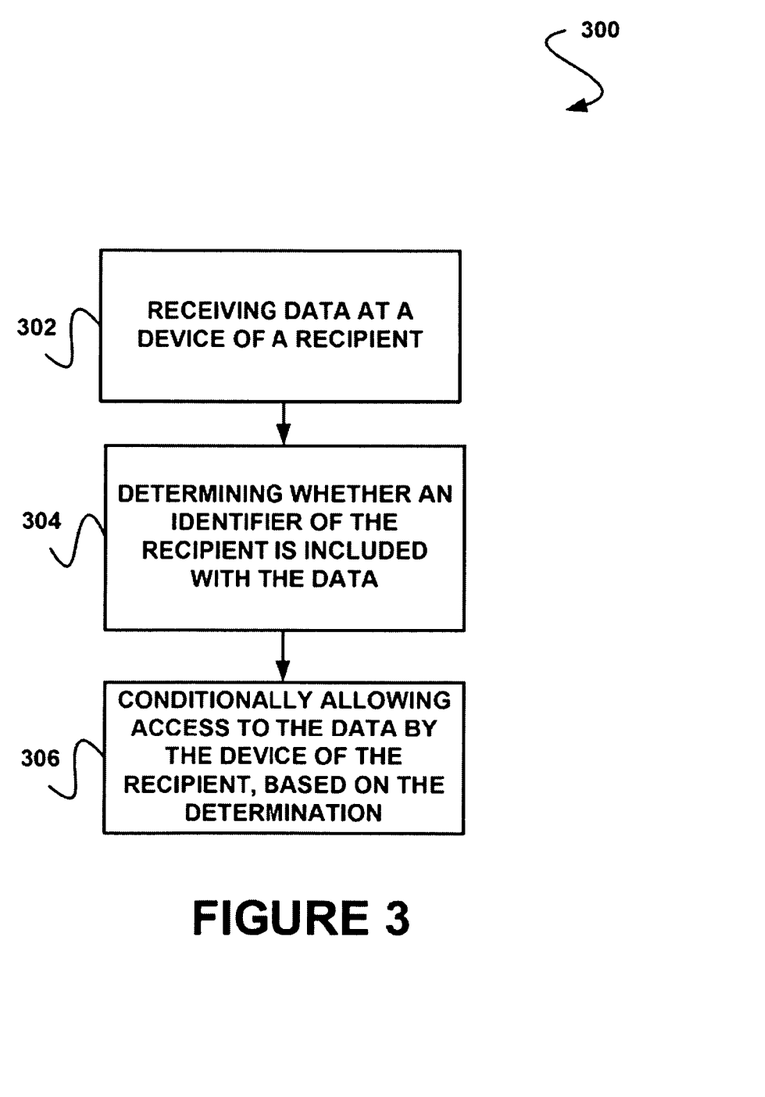
FIG. 3 shows a method for allowing access to data based on a recipient identifier included with the data, in accordance with one embodiment.

FIG. 3 shows a method 300 for allowing access to data based on a recipient identifier included with the data, in accordance with one embodiment. As an option, the method 300 may be carried out in the context of the architecture and environment of FIGS. 1 and/or 2. Of course, however, the method 300 may be carried out in any desired environment.

As shown in operation 302, data is received at a device of a recipient. In the context of the present description, the data may include any type of information capable of being received by a device. For example, the data may include an electronic mail message, a text message, a short message service (SMS) message, etc. As another example, the data may include confidential data, such as data internal to an organization, personally identifying data (e.g. social security number, etc.), etc.

Additionally, the recipient may include any user, entity, etc. receiving the data via the device. To this end, the device of the recipient may include a mobile device, a desktop computer and/or any other device via which the data may be received. As an option, the device may include any of the devices described above with respect to FIGS. 1 and/or 2.

In one embodiment, the data may be received from another device remotely located with respect to the device of the recipient. In another embodiment, the data may be received over a network. Such network may include any of the networks described above with respect to FIG. 1, for example.

Further, as shown in operation 304, it is determined whether an identifier of the recipient is included with the data. With respect to the present description, the identifier of the recipient may include any indicator of the recipient. For example, the identifier may include a name of the recipient, biometric data that identifies the recipient (e.g. a fingerprint, a facial recognition, a voice recognition, etc. of the recipient), etc. To this end, the identifier of the recipient may optionally uniquely identify the recipient.

In one embodiment, the identifier of the recipient may include a directory (e.g. Active Directory®) identifier of the recipient. In another embodiment, the identifier of the recipient may include a lightweight directory access protocol (LDAP) identifier of the recipient. In yet another embodiment, the identifier of the recipient may include a digital certificate associated with the recipient. In other various embodiments, the identifier of the recipient may include an OpenID of the recipient, an access token associated with the recipient, etc.

Moreover, it may be determined whether the identifier of the recipient is included with the data in any desired manner. In one embodiment, the data may be packaged with an identifier of an intended recipient. Such intended recipient may include, for example, a recipient to whom the data is intended to be destined, a recipient predetermined to be authorized to access the data, etc. Thus, the data may optionally be unpacked for determining whether the identifier of the recipient is included (e.g. packaged, etc.) with the data (e.g. by comparing the identifier of the recipient with the identifier of the intended recipient, etc.). For example, if the identifier of the recipient matches the identifier of the intended recipient, it may be determined that the identifier of the recipient is included with the data.

In another embodiment, the identifier of the intended recipient may be included in a header of the data. Accordingly, the header of the data may be analyzed for determining whether the identifier of the recipient is included with the data, as an option. Such analysis may include, for example, comparing the identifier of the recipient with the identifier of the intended recipient included in the header of the data, etc. Thus, if the identifier of the recipient matches the identifier of the intended recipient, it may be determined that the identifier of the recipient is included with the data. As another example, the analysis may include decoding (e.g. decrypting) the header if the header is encoded (e.g. encrypted), such that it may be determined whether the identifier of the recipient is included in the decoded header.

Still yet, determining whether the identifier of the recipient is included with the data may include comparing data entered by the recipient using the device with information included with the data (e.g. packaged with the data, in the header of the data, etc.) that indicates the intended recipient of the data, in yet another embodiment. Such data entered by the user may optionally include data (e.g. a username and/or password, biometric data, etc. and/or any combination thereof) used by the recipient to login to the device, data entered by the recipient in response to a prompt therefor, etc. To this end, if the data entered by the recipient using the device matches the information included with the data that indicates the intended recipient of the data, it may be determined that the identifier of the recipient is included with the data.

As another option, determining whether the identifier of the recipient is included with the data may include comparing data automatically identified based on the device of the recipient with information included with the data that indicates the intended recipient of the data. The data automatically identified based on the device of the recipient may include any data capable of being gathered using information stored on the device of the recipient. Accordingly, if the automatically identified data matches the information included with the data that indicates the intended recipient of the data, it may be determined that the identifier of the recipient is included with the data.

In addition, access to the data by the device of the recipient is conditionally allowed, based on the determination, as shown in operation 306. With respect to the present description, the access to the data may include any type of use of the data. For example, the access to the data may include opening the data, reading the data, writing to the data, copying the data, deleting the data, transmitting the data, printing the data, etc.

As an option, the access to the data may be conditionally allowed in response to a request for such access. For example, the recipient may request to access the data (e.g. utilizing the device), and the determination of whether the identifier of the recipient is included with the data may be performed in response to such request. Of course, however, as another option, the access to the data may be conditionally allowed in response to an automatically made determination of whether the identifier of the recipient is included with the data may be performed in response to such request. Such determination may be made automatically in response to receipt of the data at the device of the recipient, for example.

In one embodiment, the access to the data may be allowed if it is determined that the identifier of the recipient is included with the data. In this way, an intended recipient designated by an identifier included with the data may be allowed to access the data. It should be noted that such intended recipient may be designated by a sender of the data (e.g. from which the data was received) in any desired manner, such as by selecting the intended recipient from a list (e.g. database, etc.) of recipients, etc.

In another embodiment, the access to the data may be prevented if it is determined that the identifier of the recipient is not included with the data. For example, the access to the data may be blocked, the data may be automatically deleted from the device of the recipient, etc. To this end, access to the data may be prevented for a recipient of the data that is not designated as an intended recipient (e.g. by the sender of the data). Optionally, preventing such access if it is determined that the identifier of the recipient is not included with the data may prevent unwanted leakage of data via an unintended recipient of the data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
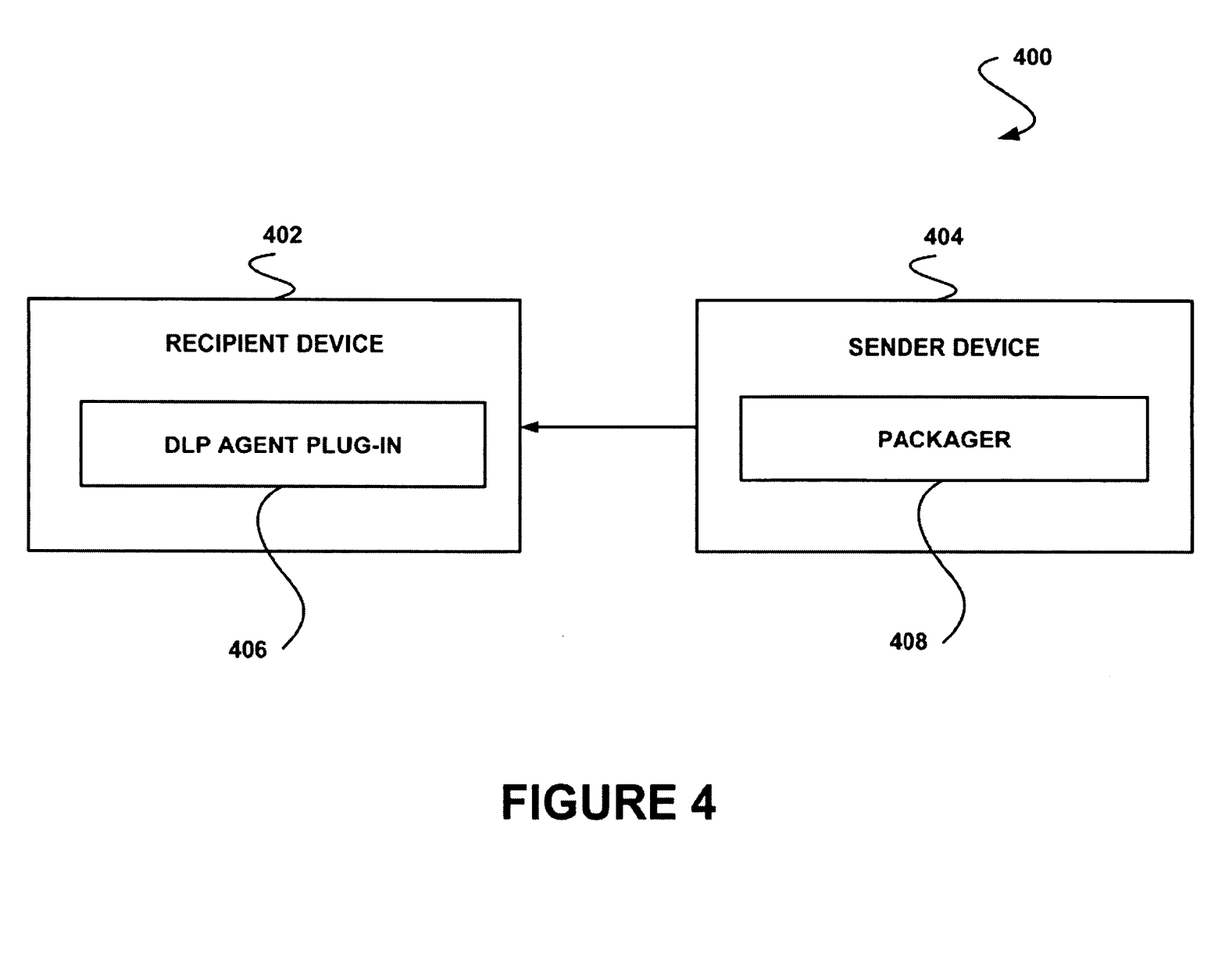
FIG. 4 shows a system for allowing access to data based on a recipient identifier included with the data, in accordance with another embodiment.

FIG. 4 shows a system 400 for allowing access to data based on a recipient identifier included with the data, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a recipient device 402 is in communication with a sender device 404. With respect to the present embodiment, the recipient device 402 may include any device capable of receiving data (e.g. from the sender device 404). Also with respect to the present embodiment, the sender device 404 may include any device capable of sending data (e.g. to the recipient device 402). Optionally, the recipient device 402 and the sender device 404 may be in communication over a network, but course may be in communication in any desired manner.

As also shown, the sender device 404 includes a packager 408. The packager 408 may be utilized for packaging data transmitted by the sender device 404 with an identifier of each intended recipient of the data. For example, the packager 408 may wrap the data with the identifier of the intended recipient of the data, may insert the identifier of the intended recipient of the data in a header of the data, etc. As an option, the packager 408 may encode the identifier of the intended recipient of the data (e.g. utilizing a digital envelope), such that the encoded identifier of the intended recipient may be included with the data.

Thus, in one embodiment, a sender may use the sender device 404 to generate data for communication of such data to another device. Additionally, the sender may select any number of recipients to which communication of the data is intended (i.e. intended recipients). Thus, the intended recipients may be selected prior to communication of the data to another device by the sender device 404.

It should be noted that the sender may select the intended recipients in any desired manner. In one embodiment, the sender may utilize the sender device 404 to select the intended recipients. In another embodiment, the sender may select the intended recipients from a list of potential recipients (e.g. recipients to which communication of the data may be intended, etc.) Such list may include, for example, a database, a contacts list of the sender, and/or any other predetermined set of recipients.

As an option, the list from which the intended recipients are selected may identify a plurality of potential recipients of the data using identifiers that are specific to the sender. For example, the identifiers of the potential recipients may be specific to an application configured for the user and used by the user to communicate the data, such as an electronic mail application, etc. Thus, in one embodiment, the selected identifiers of the intended recipients that are specific to the sender may be converted to a predetermined format (e.g. by mapping each of such identifiers to an associated common identifier via a table shared among a plurality of devices, etc.).

Such predetermined format may include any type of identifier of the intended recipient. Such identifier may optionally include a unique identifier, such as a combination of different types of information indicative of the intended recipient (e.g. biometric data, a user name and/or password, etc.). Just by way of example, name of an intended recipient selected by the sender may be converted into a user name and password of such intended recipient, based on a mapping of the name of the selected intended recipient to the user name and password.

Based on the selection of the intended recipients, the identifier of each of the selected intended recipients (e.g. the converted identifier of each of the selected intended recipients, etc.) may further be included with the data, using the packager 408, as described above. In this way, identifiers of recipients to which communication of the data is intended by the sender may be communicated with the data.

In one embodiment, the recipient device 402 may receive the data with the included identifier of each of the intended recipients. In response to receipt of the data and/or in response to a request by the recipient device 402 to access the data, a data leakage prevention agent 406, such as a plug-in as shown, of the recipient device 402 may determine whether an identifier of a recipient using the recipient device 402 is included with the data. For example, the data leakage prevention agent 406 may identify each identifier of an intended recipient of the data that was received with the data.

In one embodiment, the data leakage prevention agent 406 may unpack each identifier of an intended recipient of the data from the received data. In another embodiment, the data leakage prevention agent 406 may retrieve each identifier of an intended recipient of the data from a header of the data. In yet another embodiment, the data leakage prevention agent 406 may decode each identifier of an intended recipient of the data included with the data (e.g. unpacked from the data, etc.).

Furthermore, the data leakage prevention agent 406 may determine whether an identifier of the recipient using the recipient device 402 is included in the identifiers of the intended recipients. For example, the data leakage prevention agent 406 may compare the identifier of the recipient using the recipient device 402 with each of the identifiers of the intended recipients. In one exemplary embodiment, the identifier of the recipient may be identified by the data leakage prevention agent 406 based on input received from such recipient (e.g. via the recipient device 402). The input may include information used by the recipient to login to the recipient device 402, information input by the user in response to a prompt therefor issued by the data leakage prevention agent 406, etc.

As an option, the input received from the recipient (or optionally any other information utilized to identify the recipient) may be converted into a predetermined format (e.g. utilizing the mapping to an associated common identifier via the table shared among a plurality of devices, etc.). The identifier of the recipient using the recipient device 402 determined based on the conversion may thus optionally be used for the comparison with the identifiers of the intended recipients.

Furthermore, the data leakage prevention agent 406 may conditionally allow access to the data based on the determination of whether the identifier of the recipient using the recipient device 402 is included in the identifiers of the intended recipients. For example, if, based on the comparison, it is determined that the identifier of the recipient matches any of the identifiers of the intended recipients included with the data, the recipient device 402 may be allowed to access the data. If, however, it is determined based on the comparison that the identifier of the recipient does not match any of the identifiers of the intended recipients included with the data, the recipient device 402 may be prevented from accessing the data.

Figure 5:
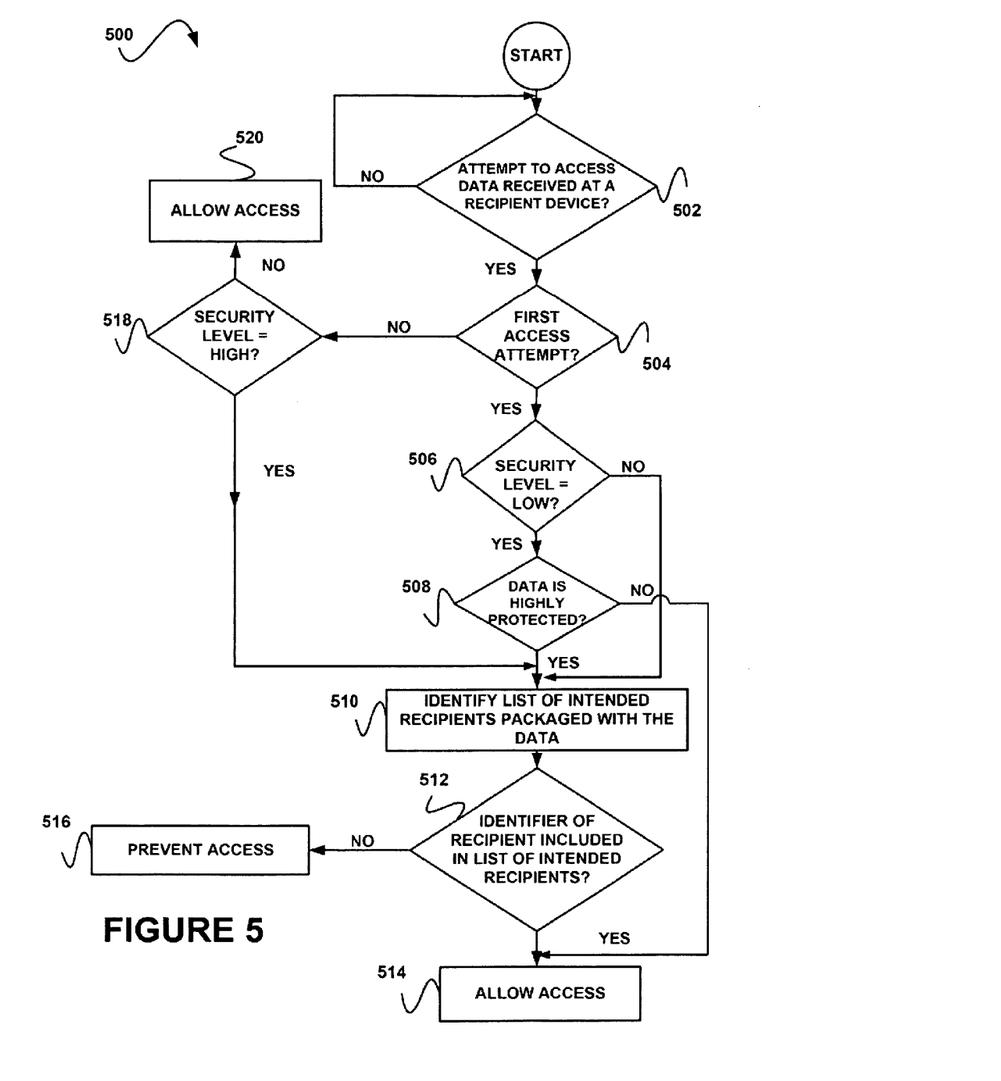
FIG. 5 shows a method for allowing access to data according to a security level utilizing a recipient identifier included with the data, in accordance with another embodiment.

FIG. 5 shows a method 500 for allowing access to data according to a security level utilizing a recipient identifier included with the data, in accordance with another embodiment. As an option, the method 400 may be carried out in the context of the architecture and environment of FIGS. 1-3. For example, the method 400 may be carried out using the data leakage prevention agent 406 of the recipient device 402 of FIG. 4. Of course, however, the method 400 may be carried out in any desired environment. Again, it should be noted that the aforementioned definitions may apply during the present description.

As shown in decision 502, it is determined whether access to data received at a recipient device is attempted. In one embodiment, the access may be attempted by a recipient using the recipient device. For example, the recipient may request such access (e.g. for reading the data, printing the data, transmitting the data, etc.).

If it is determined that access to the data is not attempted, the method 500 continues to wait for such an attempt. If, however, it is determined that access to the data is attempted, it is determined whether the attempt is a first access attempt. Note decision 504. With respect to the present embodiment, the first access attempt may include a first (e.g. initial, etc.)

attempt by the recipient device to access the data. Thus, determining that the attempt to access is the data is a first access attempt may include determining that the data has not previously been accessed by the recipient device.

If it is determined that the attempt to access the data is a first access attempt, it is determined whether a security level is low, as shown in decision 506. The security level may include a level of security applied to the recipient device (e.g. by a data leakage prevention agent of the recipient device, etc.), with respect to the present embodiment. Additionally, the low security level may include a lowest predetermined level of security capable of being applied to the recipient device, for example. In one embodiment, the low security level may be configured with predefined security features.

As shown with respect to the present embodiment, the low security level may conditionally allow automatic access to the data based on whether the data is highly protected. Such data may be highly protected if the data is classified as such. For example, the data may be classified as highly protected if the data is manually classified as such, if the data is automatically classified as such based on content of the data matching a type of content (e.g. confidential content, etc.) predetermined to be highly protected, etc. Of course, it should be noted that the low security level may be configured with any desired security features.

To this end, if it is determined that the security level is low, it is further determined whether the data is highly protected, as shown in decision 508. If it is determined that the data is not highly protected, the access to the data attempted by the recipient device is allowed. Note operation 514. In this way, authentication of the recipient using the recipient device to access the data may be avoided when the security level is low and the data is not determined to be highly protected.

If it is determined that security level is not low (decision 506), or if it is determined that the security level is low and that the data is highly protected (decision 508), a list of intended recipients packaged with the data is identified. Note operation 510. Further, if it is determined in decision 504 that the attempt to access the data is not the first access attempt, the list of intended recipients may be conditionally identified (operation 510) based on a determination of whether the security level is high (decision 518). The high security level may include a highest predetermined level of security capable of being applied to the recipient device, for example. In one embodiment, the high security level may be configured with predefined security features different than the predefined security features of the low security level.

As shown, if it is determined that the security level is not high, access to the data is allowed, as shown in operation 520. Thus, authentication of the recipient using the recipient device to access the data may be avoided when the data has been previously accessed and the security level is not high. If, however, it is determined that the security level is high, the list of intended recipients is identified (operation 510).

The list of intended recipients may include identifiers of recipients for which access to the data was intended by a sender of the data. In one embodiment, the list of intended recipients may be identified by unpacking the data. Of course, however, the list of intended recipients may be identified in any desired manner.

Furthermore, it is determined whether an identifier of the recipient using the recipient device is included in the list of intended recipients, as shown in decision 512. The identifier of the recipient may include login data used by the recipient to login to the recipient device, for example, if the security level is determined to not be high. As another example, if the security level is high, the identifier of the recipient may include data input by the recipient in response to a prompt for such data (e.g. the prompt issued based on the attempt to access the data). Thus, the identifier of the recipient may be gathered differently based on a level of security of the recipient device.

Additionally, the determination may include comparing the identifier of the recipient to the list of intended recipients. Thus, if the identifier of the recipient matches one of the intended recipient identifiers in the list of intended recipients, it may be determined that the identifier of the recipient is included in the list of intended recipients.

If it is determined that the identifier of the recipient is included in the list of intended recipients, access to the data is allowed. Note operation 514. To this end, the recipient may be authorized prior to allowing access to the data by such recipient. For example, as shown, the recipient may be authorized by verifying that the recipient is an intended recipient of the data (e.g. by matching the identifier of the recipient to one of the intended recipient identifiers in the list of intended recipients packaged with the data.

As an option, if access to the data is allowed, the access may be monitored. In one embodiment, the type of monitoring may be based on the level of security applied to the recipient device. For example, if the level of security is high and the data is in an open (e.g. readable, etc.) state, the data may be automatically closed after a predetermined amount of time if less than a threshold amount of activity (e.g. interaction, etc.) associated with the data during such predetermined amount of time has been identified. Such threshold may include a single action taken with respect to the data, for example. Automatically closing the data when the security level is high may accordingly require re-authentication of the recipient in order for the recipient to access the data again, in the manner described above.

If, however, it is determined that the identifier of the recipient is not included in the list of intended recipients, access to the data is prevented. Note operation 516. In this way, if the recipient is not authorized, the recipient may be prevented from accessing the data. As shown, such authorization may optionally only be performed if the security level is high, if the security level is medium (e.g. not high or low) and the attempt to access is the data is first access attempt, or if the security level is low and the data is highly protected.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A non-transitory computer readable medium comprising instructions stored thereon to cause one or more processors to:

receive data including a header at a device of a recipient, the header including a list of two or more identifiers of intended recipients;

identify a request to access the data by the recipient, the recipient identified by an identifier, wherein the request is authenticated based on a determination of whether the identifier of the recipient matches any of the intended recipients included with the list;

allow access to the data, avoiding the authentication, when it is determined that the data has previously been accessed by the device and a security level of the device is not high;

allow access to the data, avoiding the authentication, when it is determined that a protection level associated with the data is low and the security level of the device is low; and allow access to the data, based on the authentication, when it is determined that the identifier of the recipient is included within the list.

2. The non-transitory computer readable medium of claim 1, wherein the data includes an electronic mail message.

3. The non-transitory computer readable medium of claim 1, wherein the data includes confidential data.

4. The non-transitory computer readable medium of claim 1, wherein the identifier of the recipient includes a directory identifier of the recipient.

5. The non-transitory computer readable medium of claim 1, wherein the identifier of the recipient includes a lightweight directory access protocol (LDAP) identifier of the recipient.

6. The non-transitory computer readable medium of claim 1, wherein the identifier of the recipient includes a digital certificate associated with the recipient.

7. The non-transitory computer readable medium of claim 1, wherein the identifier of the recipient includes biometric data that identifies the recipient.

8. The non-transitory computer readable medium of claim 1, further comprising instructions to cause one or more processors to unpack the data to determine whether the identifier of the recipient is included within the header of the data.

9. The non-transitory computer readable medium of claim 1, further comprising instructions to cause one or more processors to decode the header.

10. The non-transitory computer readable medium of claim 1, wherein the instructions to cause one or more processors to determine whether the identifier of the recipient is included within the list of two or more identifiers of the intended recipients are performed by a data leakage prevention agent of the device.

11. The non-transitory computer readable medium of claim 1, wherein the instructions to cause one or more processors to determine whether the identifier of the recipient is included within the list of two or more identifiers of the intended recipients are performed by a plug-in of the device.

12. The non-transitory computer readable medium of claim 1, wherein the instructions to cause one or more processors to determine whether the identifier of the recipient is included within the list of two or more identifiers of the intended recipients include instructions to cause one or more processors to determine the identifier of the recipient by using login data used by the recipient to login to the device.

13. The non-transitory computer readable medium of claim 1, wherein the instructions to cause one or more processors to allow access to the data by the device of the recipient include instructions to cause one or more processors to prevent access if it is determined that the identifier of the recipient is not included within the list of two or more identifiers of intended recipients.

14. A method, comprising:

receiving, utilizing a processor, data including a header at a device of a recipient, the header including a list of two or more identifiers of intended recipients;

identifying, utilizing the processor, a request to access the data by the recipient, the recipient identified by an identifier, wherein the request is authenticated based on a determination of whether the identifier of the recipient matches any of the intended recipients included with the list;

allowing access to the data, avoiding the authentication, when it is determined that the data has previously been accessed by the device and a security level of the device is not high;

allowing access to the data, avoiding the authentication, when it is determined that a protection level associated with the data is low and the security level of the device is low; and allowing access to the data, based on the authentication, when it is determined that the identifier of the recipient is included within the list.

15. A system, comprising:

a memory; and a processor operatively coupled to the memory, the processor adapted to execute program code stored in the memory to:

receive data including a header, the header including a list of two or more identifiers of intended recipients, identify a request to access the data by a recipient, the recipient identified by an identifier, wherein the request is authenticated based on a determination of whether the identifier of the recipient matches any of the intended recipients included with the list, allow access to the data, avoiding the authentication, when it is determined that the data has previously been accessed by the system and a security level of the system is not high;

allow access to the data, avoiding the authentication, when it is determined that a protection level associated with the data is low and the security level of the device is low; and allow access to the data, based on the authentication, when it is determined that the identifier of the recipient is included within the list.

* * * * *